Figure 1:
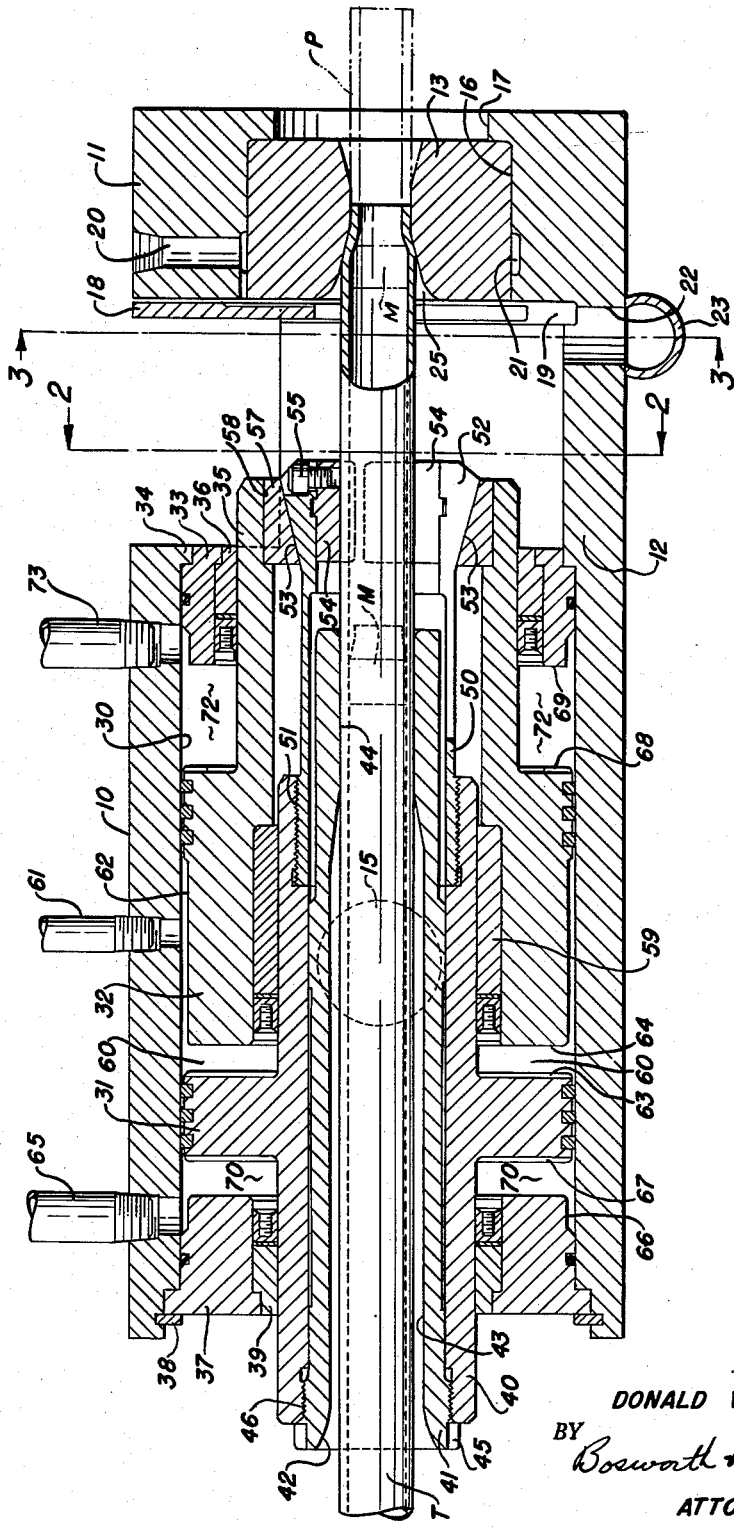

Jan. 31, 1956  D. V. STROCK  2,732,932
APPARATUS AND METHOD OF POINTING TUBES
Filed March 7, 1951  4 Sheets-Sheet 1

INVENTOR.
DONALD V. STROCK
BY Bosworth + Sessions
ATTORNEYS

Jan. 31, 1956     D. V. STROCK     2,732,932
APPARATUS AND METHOD OF POINTING TUBES
Filed March 7, 1951     4 Sheets-Sheet 2

INVENTOR.
DONALD V. STROCK
BY
ATTORNEYS

INVENTOR.
DONALD V. STROCK
BY
Bosworth + Sessions
ATTORNEYS

United States Patent Office 2,732,932
Patented Jan. 31, 1956

2,732,932

APPARATUS AND METHOD OF POINTING TUBES

Donald V. Strock, Youngstown, Ohio, assignor to The Aetna-Standard Engineering Company, Youngstown, Ohio, a corporation of Ohio Application March 7, 1951, Serial No. 214,325

1 Claim. (Cl. 205—4)

This invention relates to apparatus and method for pointing the ends of tubes, bars, rods, wire and the like, and more particularly to a hydraulically actuated push-pointer and its operation in conjunction with apparatus for drawing tubing to reduce its diameter.

In the manufacture of tubing it is frequently necessary to reduce the diameter of the tubing and elongate it by drawing it through a die, a mandrel being positioned within the tubing to control the wall thickness thereof. In operations of this sort, the end portion of the tubing must be reduced in diameter and projected through the die so that it can be grasped by the gripping jaws or tongs of the drawbench, bull block or the like utilized to draw the tube through the die. The present invention relates to an apparatus for and method of pointing the end of a tube, rod, bar, wire or the like by grasping it close to the end and then pushing the work through the die through which it is subsequently to be drawn. Inasmuch as the apparatus, which is commonly known as a push-pointer, is positioned immediately adjacent the die, handling of the work is reduced and the speed of the drawing operation is increased.

A general object of the present invention is the provision of a compact, yet powerful apparatus and a method of use of same to grasp a tube, bar, rod, wire or the like near its end and advance it through a die in which the diameter of the workpiece is reduced. Another object is the provision of a push-pointer which can be readily adjusted to accommodate workpieces of various sizes. A further object is to provide a method of pointing a workpiece whereby the workpiece is advanced through a die rapidly in a series of steps. A further object is the provision of a simple hydraulic circuit for operating such a push-pointer. Another object is the provision of a push-pointer in which the supporting frame for the push-pointer also carries the die through which the workpiece is pushed and subsequently drawn. Another object is the provision of a hydraulic push-pointer which is comparatively simple in construction and foolproof and reliable in operation. A further object is the provision of a semi-automatic method for pointing workpieces in which each workpiece is pushed through a die.

Figure 2:
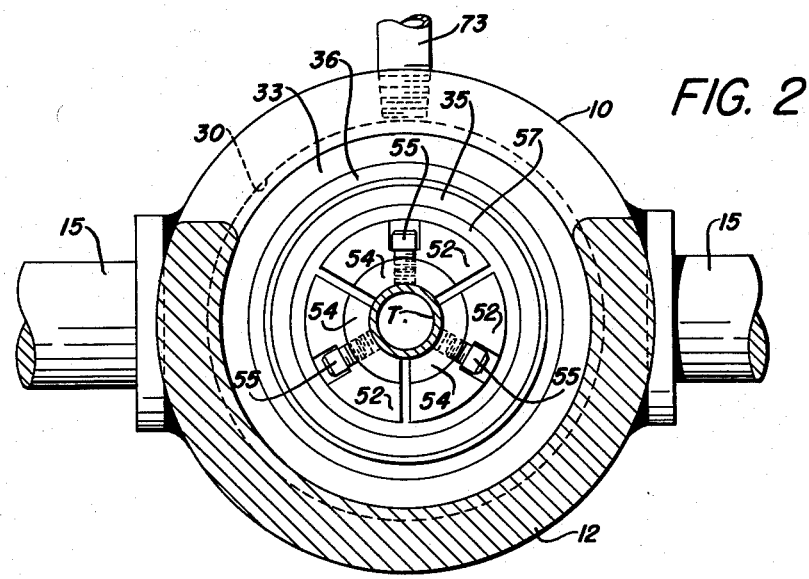
Figure 3:
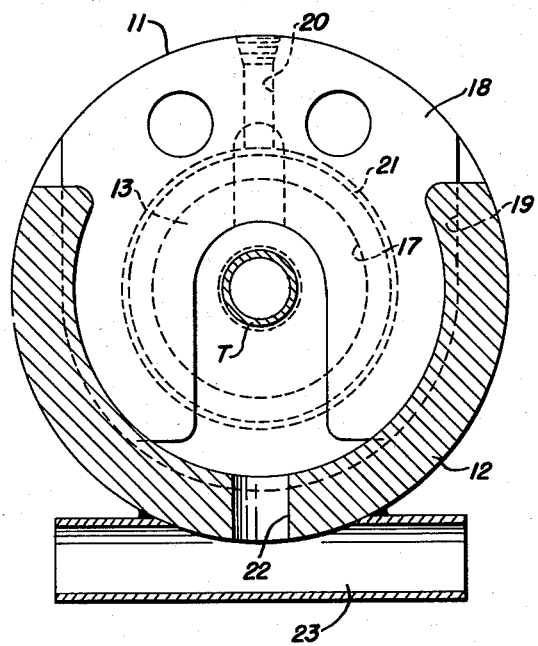
Figure 4:
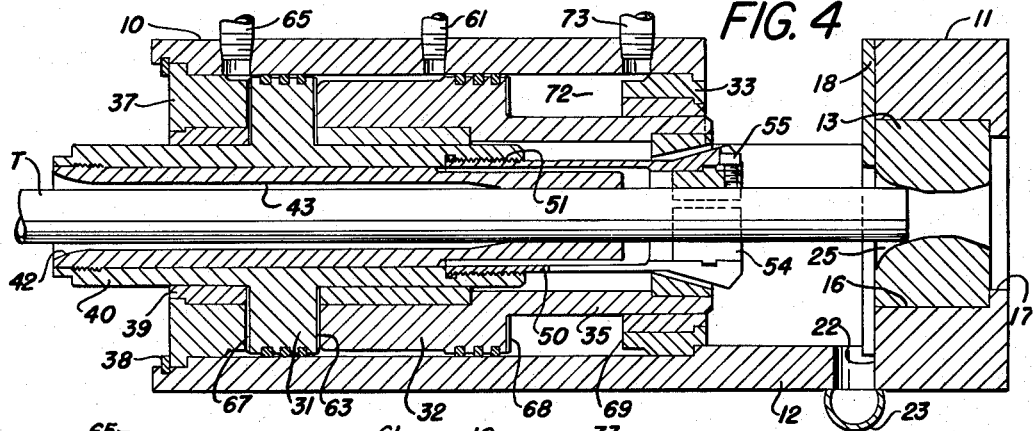
Figure 5:
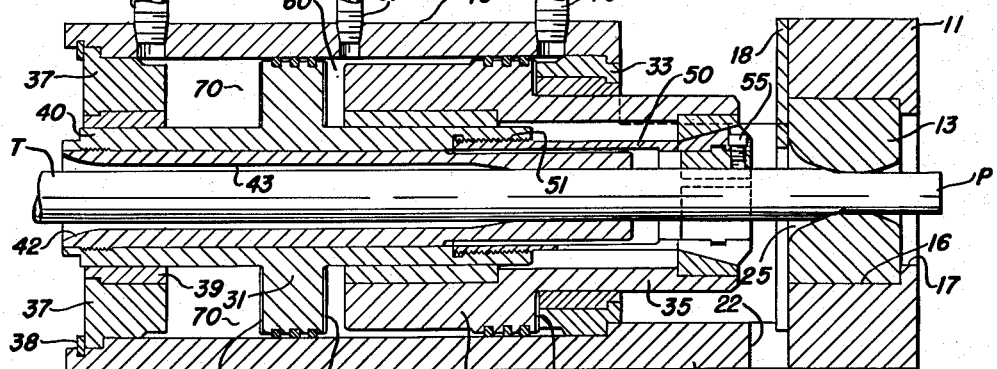
Figure 6:
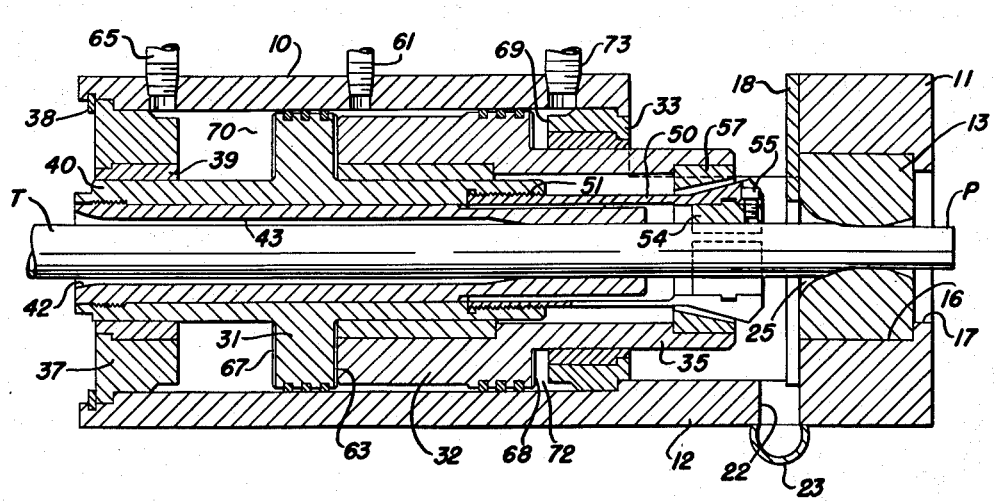
Figure 7:
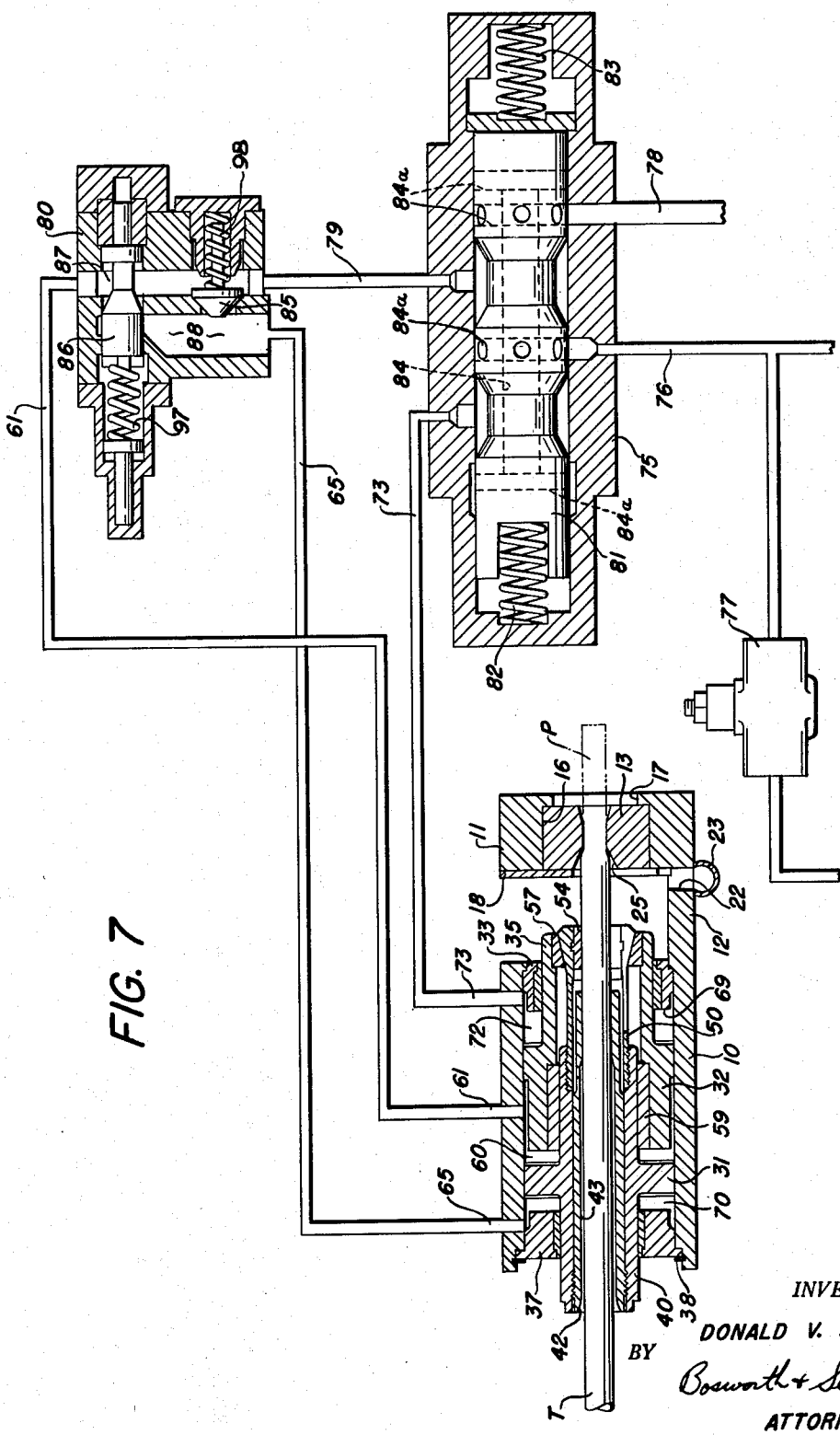

Further objects and advantages of the invention will become apparent from the following description of a preferred form thereof, reference being made to the accompanying drawings in which Figure 1 is a longitudinal cross-section through a push-pointer embodying the invention and showing the apparatus at an intermediate stage in the pushing stroke. Figures 2 and 3 are transverse cross-sectional views taken on the lines 2—2 and 3—3 respectively of Figure 1. Figures 4, 5 and 6 are diagrammatic views generally similar to Figure 1, but on a reduced scale, and showing the apparatus in different positions in its cycle of operations, and Figure 7 is a diagram illustrating the hydraulic connections of the apparatus.

Referring now to Figures 1, 2 and 3 of the drawings, a push-pointer embodying my invention preferably comprises a cylinder 10 within which the hydraulic clamping and pushing mechanism is disposed and a die holder 11. These parts are integrally joined by the connecting portion 12 which is open at the top as shown in Figures 2 and 3 to provide access to the die holder and to the clamping and pushing mechanism.

The clamping and pushing mechanism within the cylinder 10 functions to clamp and advance a tube T through the die 13, the reaction of the pushing force exerted being taken by the connecting portion 12. The entire assembly is arranged to be supported by trunnions 15 projecting horizontally from the cylinder 10 and adapted to engage suitable supports in the frame of the drawbench, bull block or other apparatus with which the pointer is employed. These trunnions support the apparatus against the tension exerted on the tube T during the usual drawing operation after the pointing has been completed and permit the apparatus to align itself with the drawing force.

As shown in Figures 1 and 3, the die 13 is supported within a recess 16 in the die holder 11, being held against a shoulder 17 during the pointing and drawing operations and being retained against backward movement by plate 18 which slips into a groove 19 in the inner side of the connecting portion 12. The die may be supplied with coolant through passages 20 and 21, and coolant draining from the exterior of the tube T is collected in the connecting portion 12 and drains through the opening 22 into the return pipe 23. While the arrangement just described is preferred, it is evident that any conventional type of support for the die may be employed, the arrangement of the die and the cooling thereof forming no part of the present invention.

The die, as is conventional, has a flared opening 25 through which the tube T is drawn to reduce its diameter and to elongate it. In order to initially push the tube T through the die, and thus provide it with a point P (shown in dot-dash lines) projecting through the die and which is arranged to be grasped by the gripping jaws or tongs of a drawbench or bull block, I employ the hydraulic mechanism illustrated within the cylinder 10. As shown particularly in Figure 1, cylinder 10 has a central bore 30 within which an actuating piston 31 and a clamping piston 32 are disposed. The ends of the cylinder are constituted by a cylinder head member 33 which abuts against flange 34 and through which the tubular sleeve 35 of clamping piston 32 extends. Packing 36 is employed to prevent leakage of fluid along the sleeve. At the other end the cylinder is enclosed by an annular cylinder head member 37 that is retained in place by a snap ring 38, cylinder head 37 being provided with packing 39 through which sleeve 40 of the actuating piston 31 extends.

In order to guide and clamp the tube T which passes through the sleeve 40 of piston 31, a separate guide member 41 is removably secured within the sleeve. Guide 41 has a flared entry 42, a cylindrical portion 43 that is spaced apart from the tube, and a guiding portion 44 which is dimensioned to fit the tube, to be drawn with a clearance of $\frac{1}{16}$ inch. The projecting end 45 of the guide 41 is shaped for engagement with a wrench so that the guide can be removed readily simply by unscrewing the threaded connection 46 with the end of the sleeve 40. Thus, it is a simple matter to remove one guide and replace it with another when a change is made in the size of tubing to be drawn.

At the other end of the sleeve 40, a tube gripping collet 50 is provided. The base of the collet is supported in the sleeve 40 by the co-operating threads 51. The collet jaws 52 having conical outer surfaces 53 are disposed at the forward end of the collet. These carry tube gripping pads 54 which are secured in place by set screws 55. Thus, when it is desired to draw tube of different size, it is only necessary to replace the pads 54 to adjust the collet to correspond to the size of the tube to be drawn.

In order to urge the jaws of the collet inwardly into clamping engagement with a tube disposed within them, a conical cam or clamping ring 57 is pressed into the enlarged end bore 58 of the sleeve 35 of the clamping piston 32. With this arrangement, if the clamping piston 32 is moved away from the advancing piston 31, i. e., if the pistons are moved apart, then the clamping ring 57 will engage the conical surfaces 53 of the jaws 52 and force the pads 54 into clamping engagement with the exterior of the tube. In order to produce such clamping movement, the sleeve 40 on the side of piston 31 toward the collet 50 makes a leakproof sliding fit within the packing 59 carried by the piston 32. Thus, the pistons 31 and 32 define a pressure chamber 60 between them, this chamber being sometimes hereinafter referred to as the clamping chamber. Fluid under pressure admitted to this chamber through conduit 61 will force the two pistons apart and, thus, clamp the collet on the exterior of the tube. The skirt of piston 32 is reduced in diameter as at 62 to permit fluid to flow to the chamber 60, and the face of piston 31 is grooved as at 63 so that fluid can enter the space between the two pistons even though the end 64 of piston 32 abuts the adjacent face of piston 31.

It will be apparent that if an incompressible liquid is used to force pistons 31 and 32 apart and thereby to clamp the collet on the tube, and if this liquid is retained within the clamping chamber 60, the piston 31 can be moved to the right in the arrangement shown in the drawing to advance the tube into the die, the clamping pressure on the tube being maintained because the incompressible fluid within the clamping chamber will cause the piston 32 to advance simultaneously with the piston 31. In order to advance piston 31, fluid under pressure is admitted to the chamber 70 through conduit 65, chamber 70 being sometimes hereinafter referred to as the advancing chamber. Cylinder head 37 is relieved as at 66 to provide a passage for the fluid, and the face of piston 31 is grooved as at 67 to permit fluid to flow between the piston 31 and the cylinder head 37.

Once the pistons 31 and 32 have, in effect, been locked together by the fluid within the chamber 60 the assembly can be advanced by supplying fluid under pressure to the advancing chamber 70 until the shoulder 68 of piston 32 engages the stop provided by the inner end 69 of cylinder head member 33. Thereafter, the collet can be released from the tube and the pistons retracted by retaining fluid under pressure in the advancing chamber 70, releasing the fluid under pressure in chamber 60 and supplying fluid under pressure to chamber 72 between piston 32 and cylinder head 33 through conduit 73. Chamber 72 is hereinafter sometimes referred to as the retracting chamber. This arrangement permits the clamping piston 32 to be moved closer to piston 31, thus releasing the grip of the collet on the tube, the advancing piston 31 being held against motion by the fluid under pressure in advancing chamber 70. After the collet has been released from the tube, continued application of pressure through the conduit 73 will cause the end 64 of piston 32 to abut the grooved face 63 of piston 31 and, thereupon, the advancing piston 31 can be moved to the left to retracted position either by relieving the pressure in advancing chamber 70 while maintaining pressure in the retracting chamber 72 or by building up pressure in the retracting chamber sufficiently in excess of the pressure in the advancing chamber to overcome the hydraulic pressure on the face 67 of the piston 31.

Thus, it will be evident that by suitably controlling the application of fluid such as oil under pressure to the chambers 60, 70 and 72 through the conduits 61, 65 and 73, respectively, the apparatus can be caused to clamp a tube disposed within the collet, advance the clamped tube toward the die, release the tube, retract the mechanism to initial position, clamp the tube again, advance the tube another step, and so on, until a sufficient length of tubing has been forced through the die to provide a point P of adequate length for gripping in the subsequent drawing operation. Finally, the collet is simply released from the tube, the apparatus moved to retracted position and the length of tubing drawn through the die with the pointing apparatus remaining in position.

In order to accomplish the above described sequence of operations, a hydraulic circuit such as shown diagrammatically in Figure 7 is preferably employed. In this system, hydraulic fluid under pressure of, for example, several hundred pounds per square inch, is delivered by a pump of any convenient type (not shown), to a 4-way main control valve 75 through conduit 76, excessive pressures being prevented by a pressure relief valve 77 which is arranged to discharge to the tank or sump from which the pump receives its fluid supply. The main control valve 75 has an outlet 78 also leading to the tank, an outlet connection 79 leading to the sequence control valve 80 and another outlet to which the conduit 73 is connected. The valve 75 is shown as embodying a valve member 81 in the form of a spool which is centered in the position shown by springs 82 and 83 and is adapted to be controlled by solenoids or other convenient control mechanism not shown. Spool 81 has a central bore 84 with which spaced radially extending ports 84a communicate to provide for passage of fluid internally of the spool from and to the various external conduit connections. In the center or off-position of the valve, the pump line 76 is simply connected to line 78 leading to the return tank so that the fluid delivered by the pump is re-circulated without load on the pump except that due to the friction in the lines, and conduits 73 and 79 are disconnected from the pump and from the return line 78 leading to the tank. When the spool 81 is moved to the left in the embodiment shown in the drawing, fluid under pressure delivered by the pump is supplied to line 79 while line 73 is connected to the return line 78. When the spool 81 is moved to the right the connections are reversed, fluid under pressure being supplied by the pump to line 73 while line 79 is connected to line 78 leading to the tank.

The clamping and advancing actions of the push-pointer are controlled by the sequence valve 80 which, in effect, consists of a check valve 85 and a pressure regulating valve 86 in the same housing. Valve 80 has a passageway 87 leading straight through the valve and connected to conduit 61 through which fluid under pressure is supplied to chamber 60 within cylinder 10 to actuate the tube clamping piston 32. The valve housing also has a passageway 88 which conects with the check valve 85 and pressure regulating valve 86 and leads to conduit 65 which is connected to chamber 70 for supplying fluid to the advancing piston 31.

With the spool 81 moved to the left to initiate the operation of the pusher mechanism, fluid under pressure from the pump is permitted to flow through conduit 79, passageway 87 and conduit 61 to clamping chamber 60 without obstruction. Check valve 85 blocks flow of fluid between passageways 87 and 88, and pressure regulator valve 86 likewise prevents flow of fluid between passageways 87 and 88 until the back pressure in chamber 60 has built up sufficiently to move valve 86 against the force exerted by spring 97; communication is then established between chambers 87 and 88, and fluid under pressure can flow through conduit 65 to advancing chamber 70. Thus, with spool 81 moved to the left, pressure is first supplied to clamping chamber 60 to clamp the jaws of collet 50 against the tube and, then, pressure is supplied to advancing chamber 70 to advance the collet and the tube clamped thereby toward the die 13. Inasmuch as the action of the spring 97 in valve 80 maintains a constant differential between the fluid pressures in passages 87 and 88 with the pressure in passage 87 always in excess of the pressure in passage 88, and inasmuch as the areas on opposite sides of piston 31 are equal, it will be apparent that the pressure of the fluid in advancing chamber 70 can never overcome the pressure of the fluid in clamping chamber 60 and that movement of the piston 31 to the right to advance the tube must be accompanied by movement of piston 32, the clamping pressure exerted by the collet being at all times maintained by the pressure in clamping chamber 60 acting between pistons 31 and 32.

During advancing movement of the pistons 31 and 32 fluid in chamber 72 ahead of piston 32 is discharged through conduit 73, and valve 75 to conduit 78 leading to the tank.

With the spool 81 in the opposite position, i. e., to the right in the embodiment shown in the drawing, conduit 79 is connected to the tank and fluid pressure from the pump is admitted to conduit 73 leading to the retracting chamber 72. The pressure of fluid in chamber 72 tends to retract piston 32, moving it toward piston 31. Fluid in chamber 60 can flow back through conduit 61 and passageway 87 in valve 88 to conduit 79 and thence to the tank without substantial back pressure. Therefore, movement of the clamping piston 32 toward the advancing piston 31 meets with no substantial resistance, and as soon as the spool 81 is moved to the right the piston 32 moves to the left to release the collet jaws from the tube.

The releasing action will not take place properly unless the jaws of the collet 50 are prevented from moving in the retracting direction (to the left in the drawings) with the clamping piston 32. Another function of valve 85 is to prevent movement of piston 31 in the retracting direction until the collet jaws have been released by movement of the piston 32. The arrangement is such that fluid in the advancing chamber 70 is prevented by check valve 85 from flowing back until the pressure in chamber 70 and conduit 65 is built up sufficiently to overcome the spring 98, thus opening valve 85 and permitting the return of fluid from chamber 70 through conduit 65 into passage 88 opening check valve 85 and thence into passage 87 conduit 79, and so to the tank. This pressure is set at a value sufficiently high that movement of piston 31 is prevented until after the collet is released.

The operation of the apparatus will be evident from a consideration of the diagrams, Figures 4, 5 and 6 with Figure 1 and the hydraulic diagram Figure 7. Initially, the tube T is inserted within the pointer with the pistons 31 and 32 in retracted position as shown in Figure 4, the tube being pushed forwardly until it abuts the die and the mandrel plug M being disposed far enough away from the end of the tube so that it will not move into drawing position during the pointing operation. Then, the main control valve is actuated to supply fluid under pressure to line 79 by moving the spool to the left. Pressure is thereupon first supplied to conduit 61 to securely clamp the tube in the collet and, then, to conduit 65 to advance the tube through the die. Figure 1 illustrates the position of the parts after the clamping operation has been completed and with the advancing piston 31 moved part way along its stroke to begin the movement of the tube through the die. The position of the parts at the completion of the advancing stroke is shown in Figure 5. Here, the collet is still clamped on the tube and the piston 32 has come to the end of its stroke abutting the annular cylinder head member 33.

After the advancing stroke has been completed, which takes only a very short period of time, the operator actuates main control valve 75 to move the spool to the right, reversing the connections therethrough. The first action that takes place is that fluid under pressure is supplied to retracting chamber 72 through conduit 73, thus moving the clamping piston 32 in the retracting position until it engages piston 31, fluid from clamping chamber 60 flowing back to the tank through conduit 61. This is the position in which the parts are shown in Figure 6. Thereafter, as soon as pressure in advancing chamber 70 has been built up to the predetermined value and valve 85 opened (valve 85 being set to open at a pressure substantially less than the pump pressure supplied through conduit 73 to chamber 72 but great enough to retain piston 31 against movement until piston 32 has been retracted to release the collet), then the fluid in chamber 70 returns through conduit 65, valve 80, conduit 79 and main control valve 75 to conduit 78 leading to the tank and thus permitting piston 31 to be moved by piston 32 to the retracted position shown in Figure 4. This operation also takes very little time and the operator controls the valve 75 to advance and retract the push-pointer a sufficient number of times to push a sufficient length of tubing through the die 13 in a series of steps to produce a point P of adequate length to be grasped by the gripping jaws of the drawing apparatus. Ordinarily, only two or three strokes of the push-pointer are required to produce the desired length of point. Thereupon, the drawing operation can be initiated immediately. Thus, the pointing operation can be completed in a very short time and production of tubing substantially increased as compared with prior methods.

It will be noted that inasmuch as the mandrel M is not in position adjacent the die or within the die during the pointing operation, the effect of the pointing operation is to reduce the diameter of the tube and thicken the wall thereof. This is advantageous because it provides a strong point to be grasped by the gripping jaws. After the pointing operation has been completed and the drawing operation initiated the mandrel M is moved into correct drawing position as indicated in broken lines in Figure 1. In the drawing, a floating mandrel is illustrated which moves into position by frictional engagement with the interior of the tube. Obviously, the mandrel may be supported on a mandrel rod and advanced into position by the rod if desired. A floating mandrel is ordinarily employed when coils of tubing are drawn, as on a bull block, while in drawbenches, where straight lengths of tubing are drawn, the mandrel is ordinarily supported upon a mandrel rod extending to the end of the tubing away from the die.

It is intended the patent shall cover, by summarization in the appended claims, whatever features of patentable novelty reside in the invention.

I claim:

A push-pointer comprising a cylinder, a pair of pistons therein, work-gripping jaws operatively connected to one of said pistons, cam means operatively connected to the other of said pistons and coacting with said jaws to effect clamping of a workpiece upon movement of said other piston away from said one piston, the two pistons defining between them a clamping chamber, said one piston and one end of the cylinder defining an advancing chamber, said other piston and the other end of said cylinder defining a retracting chamber, a source of fluid under pressure, fluid conduits leading from said source to said clamping, advancing and retracting chambers, valve means for controlling the flow of fluid in said conduits, said valve means including a main control valve adapted in one position to simultaneously connect said clamping and advancing chamber conduits to said source and connecting said retracting chamber conduit to atmosphere, said main control valve in another position connecting said retracting chamber conduit to said source and connecting said clamping and advancing chamber conduits to atmosphere, a pressure control valve in said clamping and advancing chamber conduits between said main control valve and said cylinder, said pressure control valve being responsive to differential pressures in said clamping chamber and said advancing chamber and maintaining a greater pressure in said clamping chamber than in said advancing chamber when said main control valve is in said one position and maintaining a greater pressure in said advancing chamber than in said clamping chamber when said main control valve is in said other position.

References Cited in the file of this patent

UNITED STATES PATENTS

| | | |
|---|---|---|
| 332,889 | Gerry | Dec. 22, 1885 |
| 1,964,023 | Armstrong | June 26, 1934 |
| 2,335,939 | Hill | Dec. 7, 1943 |